US006633570B1

United States Patent
Lovell et al.

(10) Patent No.: US 6,633,570 B1
(45) Date of Patent: Oct. 14, 2003

(54) EFFICIENT TRANSMISSION OF DATA TO MULTIPLE NETWORK NODES

(75) Inventors: Anthony M. Lovell, Cambridge, MA (US); Sylvan Clebsch, San Francisco, CA (US); Greg Cockroft, Grand Ledge, MI (US)

(73) Assignee: Paltalk Holdings, Inc., New York, NY (US)

( * ) Notice: Subject to any disclaimer, the term of this patent is extended or adjusted under 35 U.S.C. 154(b) by 0 days.

(21) Appl. No.: 09/248,371

(22) Filed: Feb. 8, 1999

(51) Int. Cl.$^7$ ............................................. H04L 12/28
(52) U.S. Cl. ...................................... 370/400; 370/408
(58) Field of Search ............................... 370/229, 235, 370/236–236.2, 270, 312, 328, 389, 392, 400, 401, 410, 422, 902, 911, 351, 408; 455/13.2, 69

(56) References Cited

U.S. PATENT DOCUMENTS

| | | | | |
|---|---|---|---|---|
| 4,864,559 A | * | 9/1989 | Perlman | 370/400 |
| 5,331,637 A | | 7/1994 | Francis et al. | 370/54 |
| 5,787,083 A | * | 7/1998 | Iwamoto et al. | 370/400 |
| 5,850,396 A | | 12/1998 | Gilbert | 370/390 |
| 5,856,976 A | * | 1/1999 | Hirano | 370/401 |
| 5,999,517 A | * | 12/1999 | Koning et al. | 370/235 |
| 6,385,201 B1 | * | 5/2002 | Iwata | 370/400 |

OTHER PUBLICATIONS

Yogen K. Delal, Broadcast Protocols In Packet Switched Computer Networks, Technical Report No. 128, Digital Systems Laboratory, Stanford University, Apr., 1977.

Aguilar, "Datagram Routing for Internet Multicasting", ACM SIGCOMM 14 No. 2, Jun. 1985, pp. 58–63.

Dalal et al., "Reverse Path Forwarding of Broadcast Packets", Communications of the ACM, Dec. 1978, vol. 21, No. 12, pp. 1040–1048.

Wall, "Mechanisms for Broadcast and Selective Broadcast", Dissertation Submitted to the Department of Computer Science and the Committee on Graduate Studies of Stanford University in Partial Fulfillment of the Requirements for the Degree of Doctor of Philisophy, pp. 1–87, 1980.

Ariel J. Frank et al., "Multicast Communication on Network Computers", IEEE Software pp. 49–61, 1985.

Waitzman et al., Network Working Group, "Distance Vector Multicast Routing Protocol", 11/88, http://www.ietf.org/rfc/rfc1075.txt.

Deering, Network Working Group, "Host Extensions for IP Multicasting", 5/88, http://www.ietf.org/rfc/rfc1054.txt.

Deering, Network Working Group, "Host Extensions for IP Multicasting", 8/89, http://www.ietf.org/rfc/rfc1112.txt.

(List continued on next page.)

*Primary Examiner*—Huy D. Vu
*Assistant Examiner*—Justin M. Philpott
(74) *Attorney, Agent, or Firm*—Skadden, Arps, Slate, Meagher & Flom LLP

(57) ABSTRACT

An improved method, system, and computer program product for efficient transmission of data to multiple network nodes is disclosed. A method for transmitting a data block over a network from a first sending node to a first set of recipient nodes, comprises, in the first sending node, a) dividing the first set of recipient nodes into a subset of selected nodes, selected according to scoring criteria associated with each recipient node, and a subset of unselected nodes, b) assigning at least one of the unselected nodes to at least one selected node according to scoring criteria associated with the respective selected nodes, c) transmitting to each selected node a packet including the data block and a list of the nodes assigned to the selected node.

10 Claims, 6 Drawing Sheets

OTHER PUBLICATIONS

IP Multicast Initiative (IPMI), "How IP Multicast Works A technical overview of IP Multicast concept, addressing, group management and approaches to routing", pp. 2–12, www.ipmulticast.com.

IP Multicast Initiative (IPMI), "Introduction to IP Multicast Routing A technical overview of IP Multicast routing protocols and their features", pp. 2–12, www.ipmulticast.com.

Deering, "Multicast Routing in a Datagram Internetwork", Report No. STAN–CS–92–1415 Thesis, Department of Computer Science, Stanford University, 12/91.

* cited by examiner

EFFICIENT TRANSMISSION OF DATA TO MULTIPLE NETWORK NODES

BACKGROUND OF THE INVENTION

The growth of the Internet has spurred the development of many new programs and services that permit two-way communication between more than two users at the same time. Such communication may be in the form of typed messages, for example in the internet relay chat (IRC) service, or as voice or video transmitted over the network.

Typically such programs and services use the concept of a "channel" to refer to a set of network nodes that are in mutual communication with each other. When a node subscribes to a channel, it receives copies of all of the messages that are transmitted over the channel. Programs and services using channels must therefore provide a mechanism for distributing packets issuing from one node on the channel to all of the other nodes on the channel.

Two general models have been heretofore applied in this regard. In a peer-to-peer model each node is responsible for sending a copy of each packet to all of the other nodes on the channel. This model is limited, however, by the bandwidth of the node's network connection. For example, if the node was connected to a network by a slow dial-up connection and the node were to transmit to more than a few other nodes on the network, this could produce excessive delays. Delays are especially significant for real time audio or video communication, since they can reduce the quality of the audio or video signal received by other nodes.

An alternative to the peer-to-peer model is the client-server model. In the client server model, data communicated between the various nodes subscribing to a channel (referred to as "clients") are always directed through a dedicated intermediary computer known as the "server." In the simplest case, the server acts as a reflector of the data packets received from clients. Each packet received at the server is copied, with a copy transmitted to every other client on the channel.

Alternatively, servers may combine data received from multiple nodes (e.g. by mixing simultaneously received audio signals), and transmit the combined data to the clients on the channel.

Because the server is dedicated to retransmission of data from a large number of clients, its bandwidth may be underutilized if it is not operating at full capacity.

SUMMARY OF THE INVENTION

The present invention provides an improved method, system, and computer program product for providing communication among multiple nodes on a network.

In one aspect, the invention is a method for transmitting a data block over a network from a first sending node to a first set of recipient nodes, including, in the first sending node, a) dividing the first set of recipient nodes into a subset of selected nodes, selected according to scoring criteria associated with each recipient node, and a subset of unselected nodes, b) assigning at least one of the unselected nodes to at least one selected node according to scoring criteria associated with the respective selected nodes, and c) transmitting to each selected node a packet including the data block and a list of the nodes assigned to the selected node.

In another aspect, the invention is a method for transmitting a data block over a network from a first sending node to a first set of recipient nodes, including, the steps of, in a selected node, a) receiving from the first sending node the packet including the data block and a list of assigned nodes, b) dividing the list of assigned nodes into a subset of selected assigned nodes, selected according to scoring criteria associated with each assigned node, and a subset of unselected assigned nodes, c) re-assigning at least one of the unselected assigned nodes to at least one selected assigned node according to the scoring criteria associated with respective selected assigned nodes, and d) transmitting to each selected assigned node a packet including the data block and a list of the nodes re-assigned to the selected assigned node.

It is therefore an advantage of the invention to provide a method and system for enabling a node in a data network, having a low effective bandwidth, to transmit data to a large number of other nodes in the network, without excessive delay. It is a further advantage of the invention to provide a method and system for enabling a node in a data network to transmit data to a large number of other nodes in the network, without the use of a dedicated server.

These, and other advantages of the present invention, are fully described in the following detailed description of a preferred embodiment, and in the claims.

DESCRIPTION OF THE PREFERRED EMBODIMENT

Figure 1:
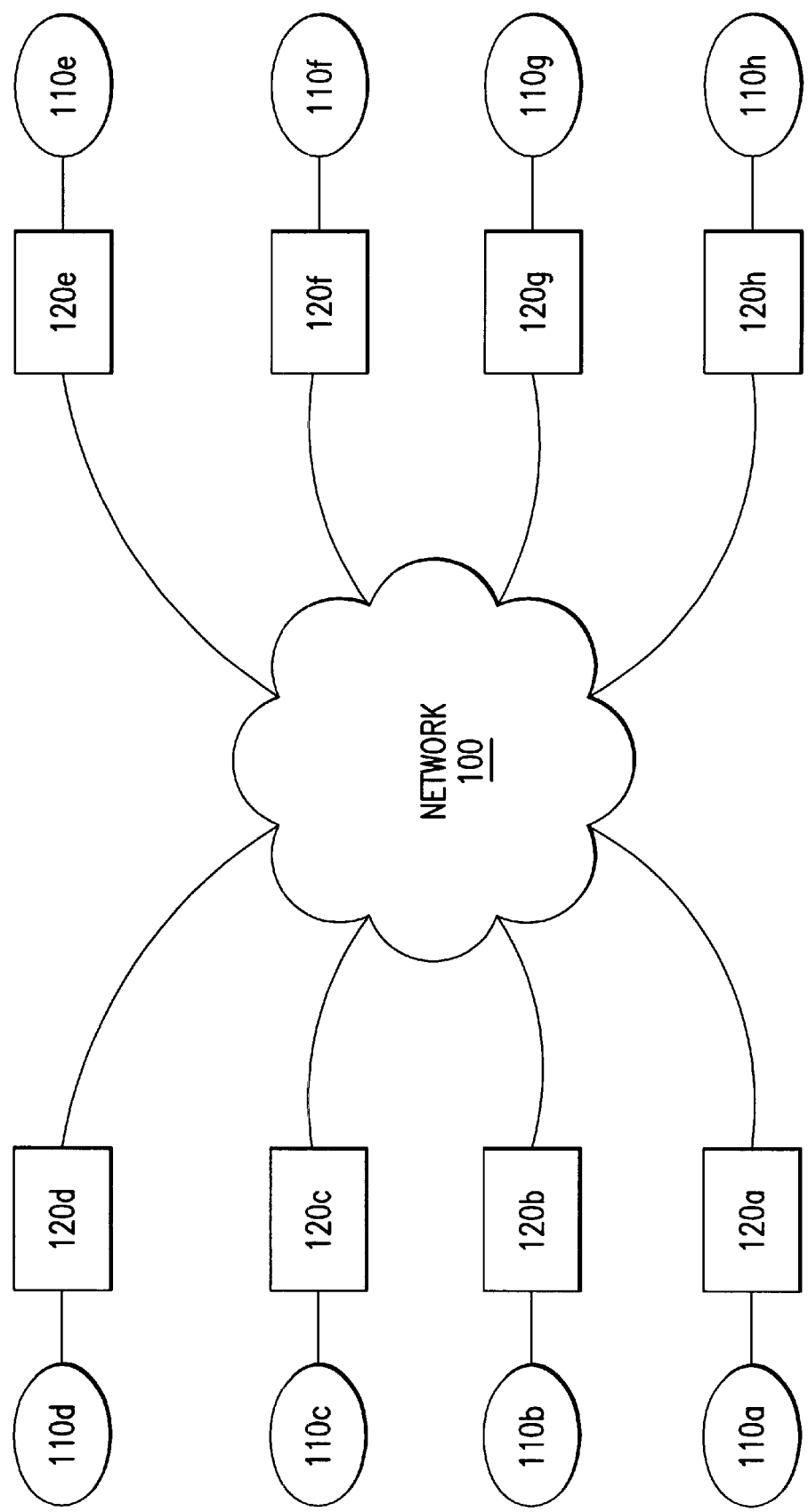
FIG. 1 shows a network for performing an embodiment of the invention.

FIG. 1 shows a computer network 100, such as the Internet, or a local area network, in which multiple nodes 110a–110h are connected to the network using a set of heterogeneous communication interfaces 120a–120h. Examples of such communication interfaces include 28.8 kilobaud modems, ISDN lines, T1 lines and T3 lines. Each communication interface 120a–120h has a characteristic bandwidth, measured in bits per second. A node may include any programmed electronic device capable of communicating data over a network, such as a computer workstation, a cable television interface, a personal communications system (PCS) device, and the like.

Figure 2:
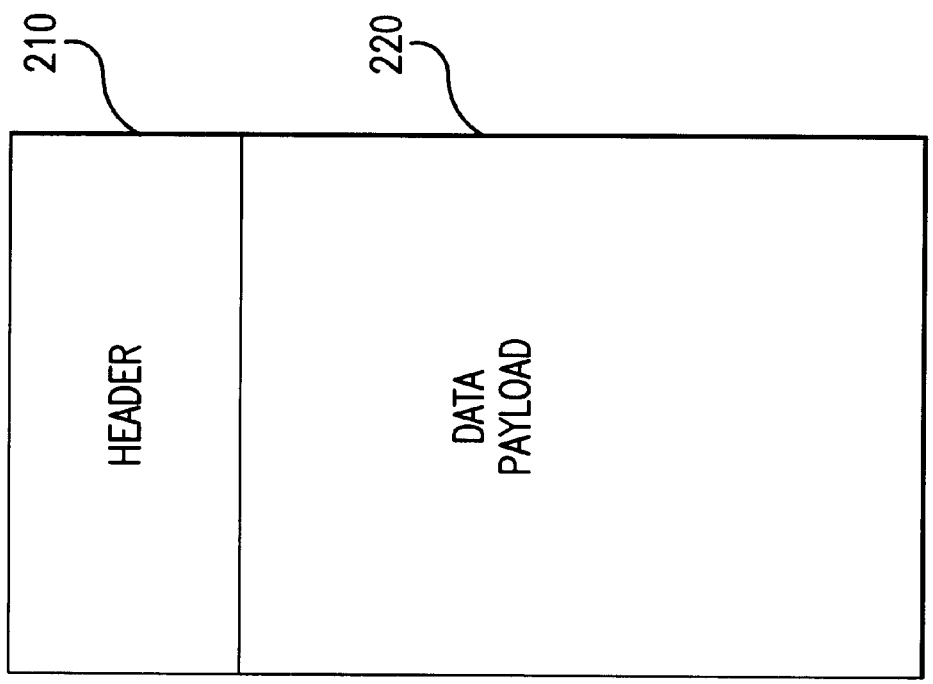
FIG. 2 is a schematic diagram of a packet for transmitting data on a network.

Nodes communicate by transmitting packets 200 via the network. As shown in FIG. 2, each packet includes a header 210, that contains addressing information, such as an internet protocol (IP) address, and a payload 220 that contains the data to be communicated to the recipient.

Figure 3:
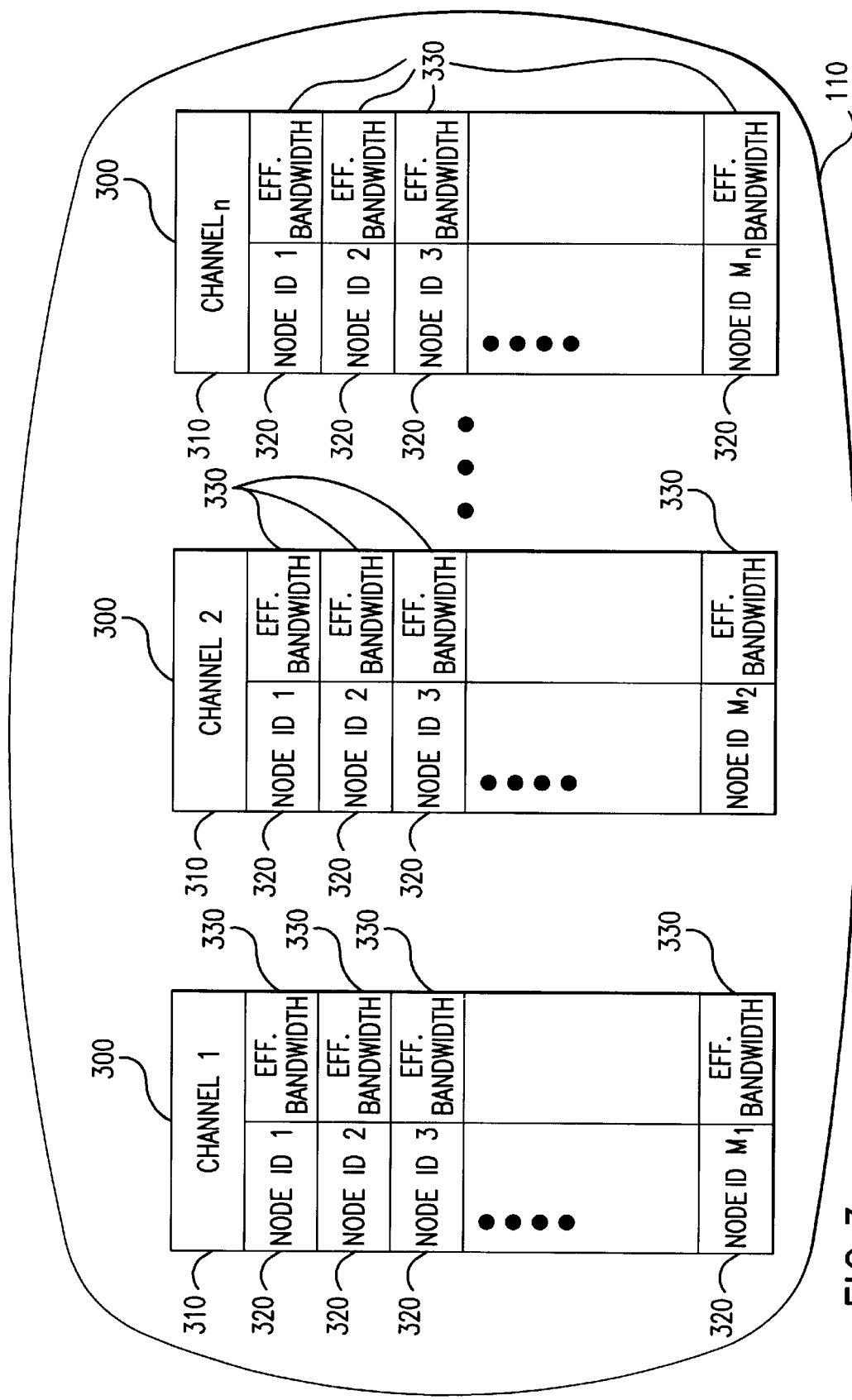
FIG. 3 is a schematic diagram showing channel lists in a node.

Referring to FIG. 3, each node on the network may, at a given time, be subscribed to one or more channels. Each node 110 maintains a channel list for each channel to which it is subscribed. A channel list 300 includes a channel ID 310, which uniquely identifies the channel, along with a set of node IDs 320, which identify every other node subscribed to the channel. Associated with each node address in the channel list 300 is an effective bandwidth value 330, a number representing the effective bandwidth of the communications interface for that node.

Channel subscription (i.e. the adding or subtracting of nodes from a channel) may be handled using any conventional method. For example, a dedicated subscription server may be used to subscribe and unsubscribe nodes on a channel. A new node could be added to the channel by transmitting a request to the server. The server, in turn, would inform all existing channel subscribers of the identity of the new member, which would update their respective channel lists 300 accordingly. Alternatively, one of the channel members could be selected to serve as the subscription server through a negotiation process between channel members.

When a node subscribes to a channel, it provides the subscription server with information about itself, including its effective bandwidth, which is retransmitted to the other channel subscribers to permit each subscribing node 110 to maintain an up-to-date channel list 300.

In general, the effective bandwidth of a node is the nominal bandwidth of the node's communications interface. However, under some circumstances, a node may provide an effective bandwidth value that is less than the nominal bandwidth of its communications interface when it cannot allocate all of its bandwidth for communication on a given channel. For example, the node might already be subscribed to other communication channels, or the node may be engaged in non-channel communication.

Figure 4:
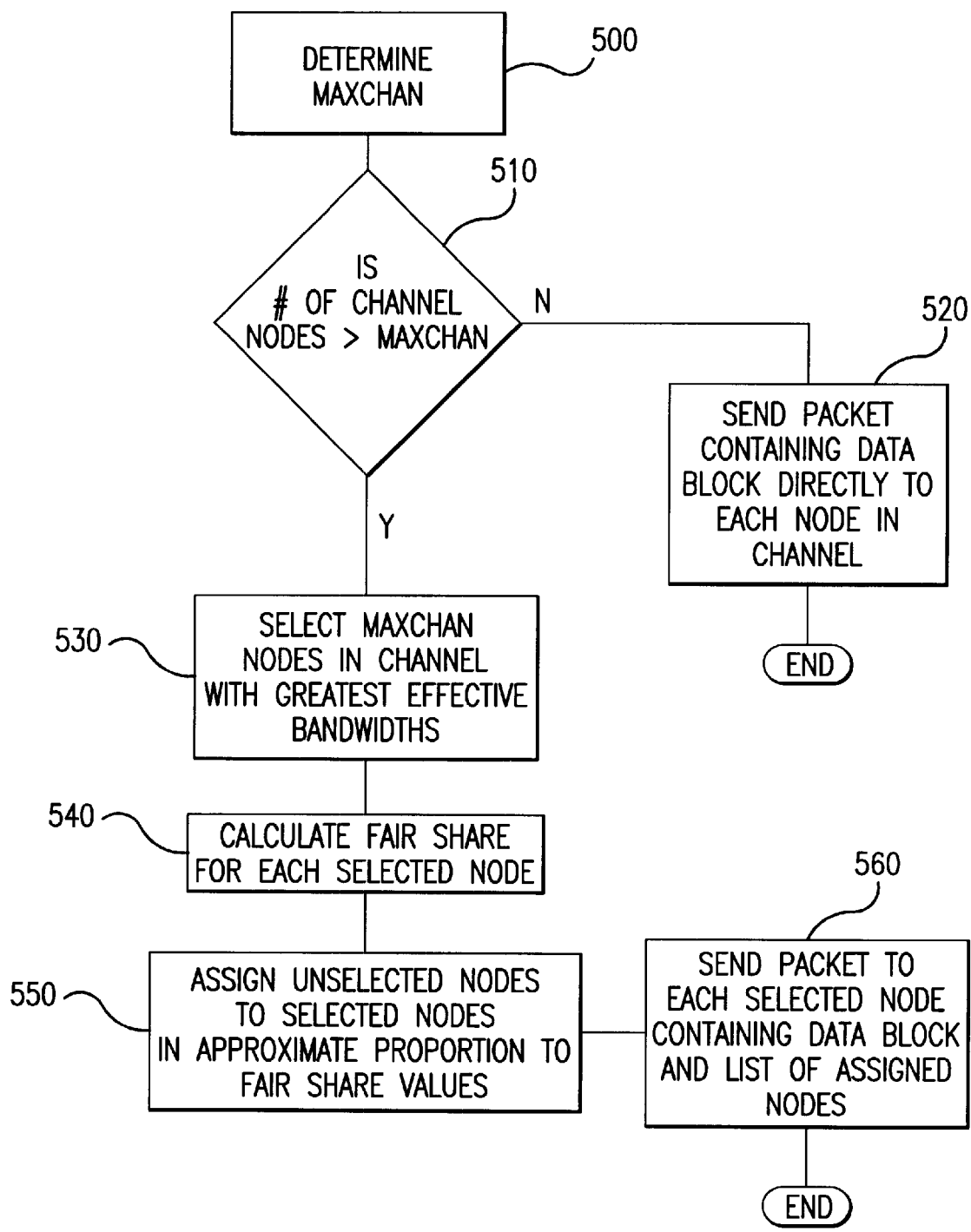
FIG. 4 is a flowchart showing steps taken by an embodiment of the invention.

The transmission of a data packet from a sending node to other nodes in a channel will now be described with reference to FIG. 4. First, the sending node 110 determines the value of MAXCHAN, the maximum number of simultaneous transmission streams that it can support (step 500). MAXCHAN may be a function of the node's effective bandwidth, or may be empirically determined.

Next, the sending node 110 examines the channel list 300 to determine whether there are more than MAXCHAN nodes on the channel (other than the sending node) (step 510). If there are not more than MAXCHAN other nodes on the channel list 300, the sending node sends packets containing the data block directly to each of the nodes on the channel list (step 520). In a preferred embodiment, the packets are sent approximately simultaneously.

If there are more than MAXCHAN other nodes on the channel list, the sending node selects the MAXCHAN number of nodes on the channel list having the highest effective bandwidths (step 530).

Next, the sending node computes, for each of the selected nodes, a fair share value (step 540). This value is computed by taking the ratio of the effective bandwidth 330 for a given selected node to the sum of the effective bandwidths 330 for all of the selected nodes.

Next, the sending node assigns each of the remaining (unselected) nodes to one of the selected nodes, in approximate proportion to the fair share values computed for each selected node (step 550). In an alternative embodiment, the sending node could assign only a portion of the unselected nodes, according to a prioritization scheme, if the node determines that the number of unselected nodes exceeds an operational limit.

Figure 5:
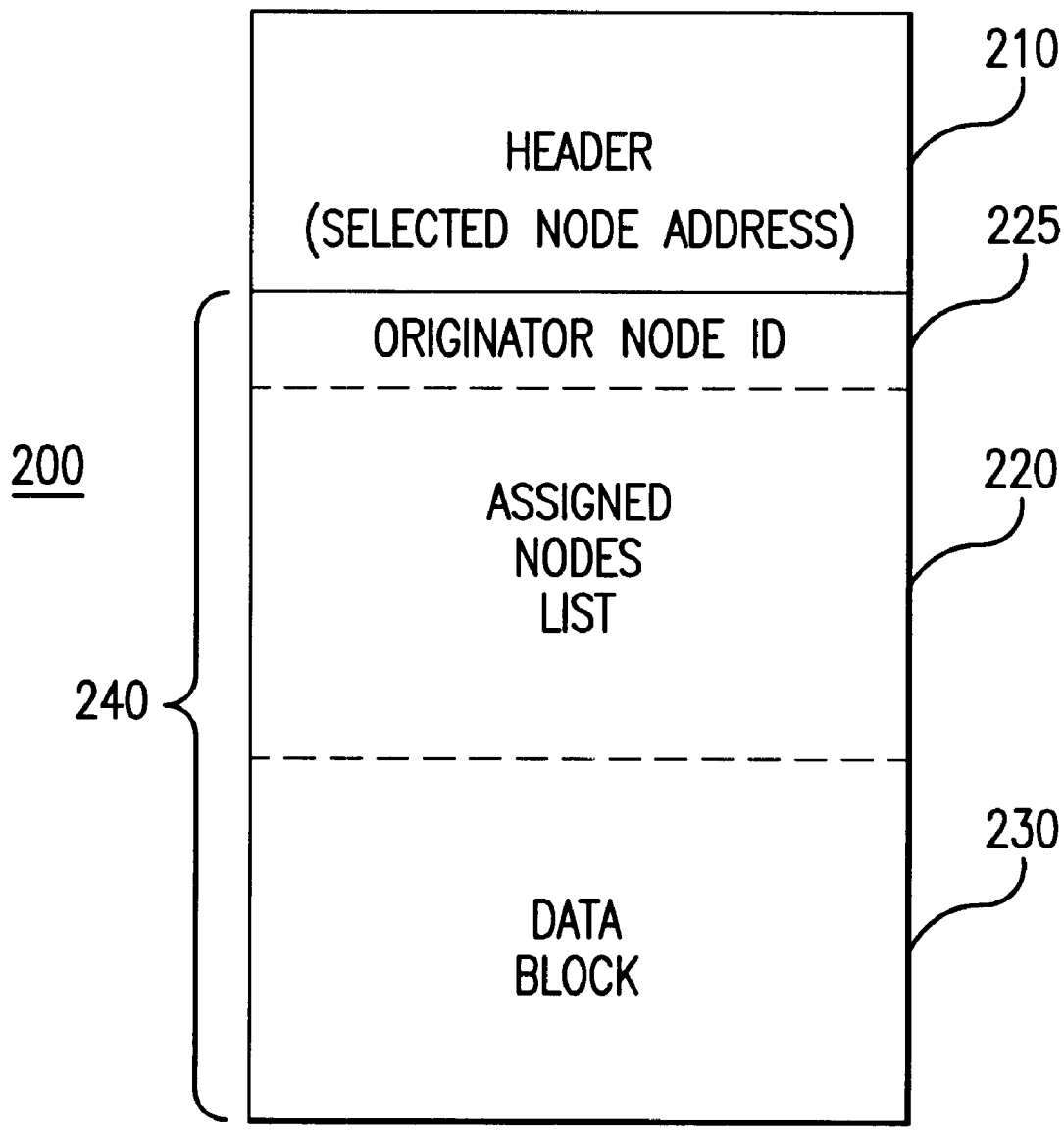
FIG. 5 is a schematic diagram of a packet used by an embodiment of the invention.

Next, the sending node sends a packet to each of the selected nodes (step 560). In a preferred embodiment, the packets are sent approximately simultaneously. Referring to FIG. 5, the header 210 of each packet is addressed to one of the selected nodes, while the payload portion 220 of each packet includes node ID of the sending node (identified as the originator of the data block) 225 the data block 230, and a list 240 of the nodes assigned to the node to which the packet is addressed.

Figure 6:
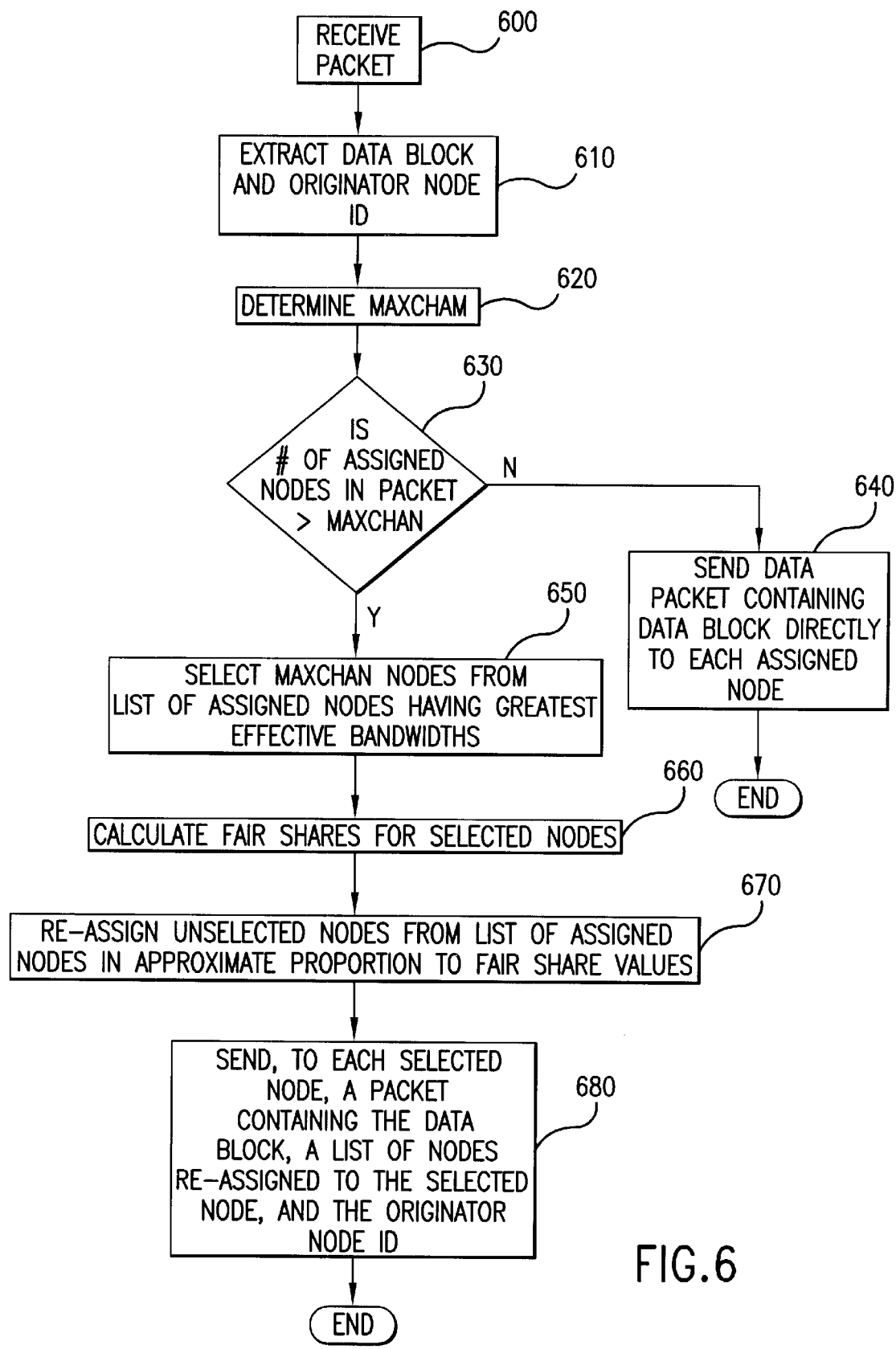
FIG. 6 is a flowchart showing steps taken by an embodiment of the invention.

Referring now to FIG. 6, when a packet from a sending node arrives at one of the selected nodes, it is received (step 600), and the originator node ID 225 and data block 230 are extracted (step 610). This information can then be used at the receiving node by other processes. For example, if the data block 230 includes audio data, the data block 230 could be used to generate audio outputs at the selected node.

The receiving node then determines its MAXCHAN value, (step 620), and compares it to the number of nodes on the list of assigned nodes in the packet received from the sending node (step 630). If the number of nodes in the list is not greater than MAXCHAN, the receiving node transmits packets containing the data block 230 to each of the assigned nodes (step 640).

If the list of assigned nodes is longer than MAXCHAN, the following steps are performed. The receiving node selects the MAXCHAN nodes from the assigned nodes list having the greatest bandwidth (step 650), and then calculates a fair share value for each of the selected nodes (step 660). It then re-assigns each of the unselected assigned nodes from the list to one of the selected nodes from the list, in approximate proportion to the fair share values of each selected node (step 670). (In an alternative embodiment, the receiving node could re-assign only a portion of the unselected assigned nodes, according to a prioritization scheme, if the receiving node determines that the number of unselected assigned nodes exceeds an operational limit.) The receiving node then transmits a packet to each of the selected nodes, containing the originator node ID 225, the data block 230, plus a list of the nodes re-assigned to the node to which the packet is addressed (step 680). Each of the nodes receiving these packets processes them in a similar fashion, by executing the steps beginning at step 600. This process continues until the data block has been distributed to all of the nodes in the channel.

In this way, the invention advantageously provides a method for distributing packets to a large number of recipient nodes on a channel, without effective limitation from the effective bandwidth of the sending node, and without using a dedicated server.

In alternative embodiments, criteria other than, or in addition to, effective bandwidth, may be used by a sending node to select recipient nodes.

In one alternative embodiment, the channel list 300 of a given node includes information identifying the latency (average delay between transmission and reception of a packet) associated with transmissions from the given node to each other node in the channel. These values are computed by the given node and updated periodically by sending test messages to the other nodes on the channel and calculating the time to receive a response. In this embodiment, nodes are selected by assigning to each a score, based on a weighted difference of the effective bandwidth and the latency of the node, and then selecting the nodes with the highest scores. Similarly, unselected nodes are assigned to selected nodes in approximate proportion to their scores, rather than their effective bandwidths.

In another embodiment, node scores are computed as a function of the effective bandwidth, latency, and recency. Recency refers to the amount of time since a data block was received that was initially sent (i.e. not merely re-transmitted as described above) by a given node. Such a function could give greater scores to nodes with lower recency values, thus making it more likely that nodes from which packets were recently received will be among the first the receive outgoing data.

In another alternative embodiment, a given unselected node may be assigned to more than one of the selected nodes, thus providing a redundant route between the sending node and the ultimate recipient for transmission of a given data block. If this resulted in multiple copies of the data block arriving at the ultimate recipient node, the ultimate recipient node would simply ignore the subsequent copies. This could be done, for example, by assigning each data block a serial number in the sending node, and comparing the serial number of each data block received by the ultimate recipient node to a list of serial numbers already received from the sending node. This embodiment would be useful where the reliability of different transmission paths in the network varies or is unknown.

The invention described herein may be implemented in software or in hardware. In particular, the invention may be implemented by programming a computer in each node to perform the steps necessary to carry out the method described herein. Programming codes for carrying such steps may be placed on a computer readable medium for convenient transport and storage.

What is claimed is:

1. A method for transmitting a data block over a network from a first sending node to a first set of recipient nodes, comprising:

in the first sending node:
   dividing the first set of recipient nodes into a subset of selected nodes, selected according to scoring criteria associated with each recipient node, and a subset of unselected nodes;
   assigning at least one of the unselected nodes to at least one selected node according to scoring criteria associated with the respective selected nodes;
   transmitting to each selected node a packet having a payload including the data block and a first list of the nodes assigned to the selected node, the list dynamically associating the selected node with the unselected nodes for the transmission of the data block to the unselected nodes;

in at least one recipient node:
   receiving from the first sending node the packet having a payload including the data block and the first list of assigned nodes;
   dividing the first list of assigned nodes into a subset of selected assigned nodes, selected according to scoring criteria associated with each assigned node, and a subset of unselected assigned nodes;
   reassigning each of the unselected assigned nodes to at least one selected assigned node according to the scoring criteria associated with the respective selected assigned nodes; and
   transmitting to each selected assigned node a packet having a payload including the data block and a list of the nodes reassigned to the selected assigned node, the list dynamically associating the selected node with the unselected nodes for the transmission of the data block to the unselected nodes.

2. The method of claim 1, wherein the at least one recipient node includes at least two recipient nodes.

3. The method of claim 1, further comprising, in the first selected node, generating a user discernable output reflecting information in the data block.

4. A method for transmitting a data block over a network from a first sending node to a first set of recipient nodes, comprising:

in the first sending node:
   dividing the first set of recipient nodes into a subset of selected nodes, selected according to scoring criteria associated with each recipient node, and a subset of unselected nodes;
   assigning at least one of the unselected nodes to at least one selected node according to scoring criteria associated with the respective selected nodes;
   transmitting to each selected node a packet having a payload including the data block and a first list of the nodes assigned to the selected node, the list dynamically associating the selected node with the unselected nodes for the transmission of the data block to the unselected nodes;

in a second sending node, which is also in the first set of recipient nodes:
   dividing a second set of recipient nodes into a subset of selected nodes, selected according to scoring criteria associated with each recipient node, and a subset of unselected nodes;
   assigning each of the unselected nodes from the second set of recipient nodes to at least one selected node from the second set of recipient nodes according to scoring criteria associated with the respective selected nodes; and
   transmitting to each selected node from the second set of recipient nodes a packet having a payload including the data block and a second list of the nodes assigned to the selected node, the list dynamically associating the selected node with the unselected nodes for the transmission of the data block to the unselected nodes.

5. The method of claim 4, further comprising: in a second selected node:
   receiving from the second sending node the packet including the data block and the second list of assigned nodes;
   dividing the second list of assigned nodes into a subset of selected assigned nodes, selected according to scoring criteria associated with each assigned node, and a subset of unselected assigned nodes;
   reassigning each of the unselected assigned nodes from the second list of assigned nodes to at least one selected assigned node from the second list of assigned nodes according to the scoring criteria associated with the respective selected assigned nodes; and
   transmitting to each selected assigned node from the second list of assigned nodes a packet including the data block and a list of the nodes reassigned to that node, the list dynamically associating the selected assigned node with the reassigned nodes for the transmission of the data block to the reassigned nodes.

6. A computer program product residing on a computer readable medium comprising instructions for causing a particular network node, connected to a network having a plurality of network nodes, to:

create a first set of recipient nodes from among the plurality of network nodes;
   divide the first set of recipient nodes into a subset of selected nodes, selected according to scoring criteria associated with each recipient node, and a subset of unselected nodes;
   assign at least one of the unselected nodes to at least one selected node according to scoring criteria associated with the respective selected nodes;

transmit to each selected node a packet having a payload including a data block and a list of the nodes assigned to the selected node, the list dynamically associating the selected node with the unselected nodes for the transmission of the data block to the unselected nodes;

receive from one of the network nodes a packet having a payload including a data block and a list of assigned nodes;

divide the received list of assigned nodes into a subset of selected assigned nodes, selected according to scoring criteria associated with each assigned node, and a subset of unselected assigned nodes;

reassign each of the unselected assigned nodes to at least one selected assigned node according to the scoring criteria associated with the respective selected assigned nodes; and transmit to each selected assigned node a packet having a payload including the received data block and a list of the nodes reassigned to the selected assigned node, the list dynamically associating the selected node with the unselected nodes for the transmission of the data block to the unselected nodes.

7. The product of claim 6, further comprising instructions for causing the particular network node to generate a user discernable output reflecting information in the data block contained in the received packet.

8. A system for transmitting data comprising:

a data network;

a plurality of network nodes, including at least one sending node; wherein each sending node is programmed to:

create a first set of recipient nodes from among the plurality of network nodes;

divide the first set of recipient nodes into a subset of selected nodes, selected according to scoring criteria associated with each recipient node, and a subset of unselected nodes;

assign at least one of the unselected nodes to at least one selected node according to scoring criteria associated with the respective selected nodes;

transmit to each selected node a packet having a payload including a data block and a list of the nodes assigned to the selected node, the list dynamically associating the selected node with the unselected nodes for the transmission of the data block to the unselected nodes;

receive from one of the network nodes a packet having a payload including a data block and a list of assigned nodes;

divide the list of assigned nodes into a subset of selected assigned nodes, selected according to scoring criteria associated with each assigned node, and a subset of unselected assigned nodes;

reassign each of the unselected assigned nodes to at least one selected assigned node according to the scoring criteria associated with respective selected assigned nodes; and transmit to each selected assigned node a packet having a payload including the received data block and a list of the nodes reassigned to the selected assigned node, the list dynamically associating the selected node with the unselected nodes for the transmission of the data block to the unselected nodes.

9. The system of claim 8, wherein the at least one of the plurality of network nodes includes at least two network nodes.

10. The system of claim 8, wherein the at least one of the plurality of network nodes includes at least one sending node.

* * * * *

UNITED STATES PATENT AND TRADEMARK OFFICE
CERTIFICATE OF CORRECTION

PATENT NO. : 6,633,570 B1
DATED : October 14, 2003
INVENTOR(S) : Lovell et al.

It is certified that error appears in the above-identified patent and that said Letters Patent is hereby corrected as shown below:

Title page,
Item [73], Assignee, should read -- Paltalk Holdings, Inc. --

Signed and Sealed this

Twenty-seventh Day of April, 2004

JON W. DUDAS
*Acting Director of the United States Patent and Trademark Office*